United States Patent
Tang et al.

(10) Patent No.: US 11,228,870 B2
(45) Date of Patent: Jan. 18, 2022

(54) METHOD AND DEVICE FOR DYNAMICALLY ADJUSTING BROADCAST AREA

(71) Applicant: INDUSTRIAL TECHNOLOGY RESEARCH INSTITUTE, Hsinchu (TW)

(72) Inventors: Yao-Jen Tang, Taoyuan (TW); Wan-Yi Lin, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 58 days.

(21) Appl. No.: 16/717,220

(22) Filed: Dec. 17, 2019

(65) Prior Publication Data

US 2021/0185488 A1 Jun. 17, 2021

(51) Int. Cl.
*H04W 4/08* (2009.01)
*H04L 29/12* (2006.01)
*H04W 24/10* (2009.01)

(52) U.S. Cl.
CPC .......... *H04W 4/08* (2013.01); *H04L 61/2069* (2013.01); *H04W 24/10* (2013.01)

(58) Field of Classification Search
None
See application file for complete search history.

(56) References Cited

U.S. PATENT DOCUMENTS 7,596,567 B2 * 9/2009 Lai .................. H04L 1/1867
8,320,292 B2 * 11/2012 Dorenbosch ........... H04W 4/06
370/312
8,988,996 B2 3/2015 Willig et al.
9,173,192 B2 * 10/2015 Zhang ................. H04W 60/00
10,075,937 B2 * 9/2018 Zhang ................. H04W 48/12
10,159,058 B2 * 12/2018 Zhang ................. H04W 8/205

(Continued)

FOREIGN PATENT DOCUMENTS

CN 1645798 A 7/2005
CN 102088660 B 8/2014

(Continued)

OTHER PUBLICATIONS

Alexiou et al., "Optimizing the Combination of MBSFN and PTM Transmissions in LTE Systems", IEEE, 2011, 7 pages.

(Continued)

*Primary Examiner* — Tri H Phan
(74) *Attorney, Agent, or Firm* — Birch, Stewart, Kolasch & Birch, LLP

(57) ABSTRACT

A method for dynamically adjusting a broadcast area is provided. The method includes the following steps. Information of at least one target base station which subscribes a broadcast service is obtained. A broadcast service base station list corresponding to a broadcast area identification code is set to contain the at least one target base station. The broadcast area identification code corresponds to the broadcast service. A command for adding a new broadcast area identification code is selectively transmitted to the at least one target base station in the broadcast service base station list so that the at least one target base station records the broadcast area identification code to receive the broadcast service corresponding to the broadcast area identification code.

18 Claims, 16 Drawing Sheets

(56) References Cited

U.S. PATENT DOCUMENTS

| | | | |
|---|---|---|---|
| 10,172,113 B2* | 1/2019 | Zhang | H04W 8/205 |
| 10,531,352 B2* | 1/2020 | Lin | H04W 36/00 |
| 2006/0034225 A1 | 2/2006 | Jung et al. | |
| 2007/0055990 A1 | 3/2007 | Seppala | |
| 2012/0170502 A1 | 7/2012 | Korus et al. | |
| 2012/0208448 A1* | 8/2012 | Goto | H04H 60/51 |
| | | | 455/3.01 |
| 2012/0236776 A1 | 9/2012 | Zhang et al. | |
| 2014/0137161 A1 | 5/2014 | Park | |
| 2014/0177506 A1* | 6/2014 | Korus | H04W 4/06 |
| | | | 370/312 |
| 2015/0124686 A1 | 5/2015 | Zhang et al. | |
| 2018/0324559 A1 | 11/2018 | Byun et al. | |
| 2021/0152383 A1* | 5/2021 | Xu | H04L 65/4076 |

FOREIGN PATENT DOCUMENTS

| | | |
|---|---|---|
| CN | 103581833 B | 9/2017 |
| CN | 108235230 A | 6/2018 |
| JP | 2012-104974 A | 5/2012 |
| JP | 2015-522224 A | 8/2015 |
| WO | WO 2018/076280 A1 | 6/2018 |

OTHER PUBLICATIONS

Gong et al., "Energy-efficiency MBMS Single Frequency Networks with User Cooperation", 19th Asia-Pacific Conference on Communications (APCC), 2013, Bali, Indonesia, pp. 315-320.

Jung et al., "Energy and Traffic Aware Dynamic Topology Management for Wireless Cellular Networks", Proceedings of the 2012 IEEE ICCS, pp. 205-209.

Kwon et al., "Hierarchical Multicast Transmission for Single Cell Point-to-Multipoint (SC-PTM) in Cellular Networks", IEEE, 2017, pp. 737-741.

Rong et al., "Analytical Analysis of the Coverage of a MBSFN OFDMA Network", IEEE, 2008, pp. 1-5.

Tuban et al., "Genetic Algorithm Approach for Dynamic Configuration of Multicast Broadcast Single Frequency Network Deployment in LTE", IEEE, 2011, 5 pages.

Wetterwald, "A Case for Using MBMS in Geographical Networking", IEEE, 2009, pp. 309-313.

Japanse Office Action, dated Jul. 6, 2021, for Japanese Application No. 2020-039785, with an English machine translation.

* cited by examiner

METHOD AND DEVICE FOR DYNAMICALLY ADJUSTING BROADCAST AREA

TECHNICAL FIELD

The disclosure relates in general to a method and a device for dynamically adjusting a broadcast area.

BACKGROUND

Referring to FIG. 1, a schematic diagram of broadcasting a program using multimedia broadcast/multicast service (MBMS) technology under the 4G long-term evolution (LTE) mobile network architecture is shown. Suppose there are three MBMS broadcast areas 208, 210 and 212 around the baseball field 205. Originally, the broadcasting of a baseball program was only available at the MBMS broadcast area 210 where the baseball field 205 is located. Later, clients x, y and z at the MBMS broadcast areas 208 and 212 subscribe the broadcasting of the baseball program. Currently, the network of the MBMS broadcast areas 208 to 212 is pre-planned and installed by telecom operators, and it will take huge costs to adjust the range of the MBMS broadcast area and to dynamically set the base station to change the range of the broadcast service. Moreover, dynamic adjustment of the range of the MBMS broadcast area cannot be completed instantly.

Therefore, when the user equipments who subscribe a specific program are distributed over the three MBMS broadcast areas 208, 210 and 212, telecom operators may be forced to either provide a temporary broadcast service to some smaller areas in the three MBMS broadcast areas 208, 210 and 212 respectively or to directly and respectively provide a program service to the new subscribers x, y and z through unicast. According to the former method, the baseball program content will be broadcasted to the broadcast area(s) of other base stations having no subscribers (e.g. no users are watching the program in the broadcast area of these base stations) in the MBMS broadcast areas 208 and 212. According to the latter method, a large volume of spectrum resource will be used to transmit repeated content. Under both circumstances, the network resource cannot be used effectively, and the resource of network frequency band will be wasted.

SUMMARY

According to one embodiment of the present disclosure, a method for dynamically adjusting a broadcast area is provided. The method includes the following steps. Information of at least one target base station which subscribes a broadcast service is obtained. A broadcast service base station list corresponding to a broadcast area identification code is set to contain the at least one target base station. The broadcast area identification code corresponds to the broadcast service. A command for adding a new broadcast area identification code is selectively transmitted to the at least one target base station in the broadcast service base station list so that the at least one target base station records the broadcast area identification code to receive the broadcast service corresponding to the broadcast area identification code.

According to another embodiment of the present disclosure, a device for dynamically adjusting a broadcast area is provided. The device includes a data collecting unit, a setting unit, and a transmission unit. The data collecting unit is configured to obtain information of at least one target base station which subscribes a broadcast service. The setting unit is configured to set a broadcast service base station list corresponding to a broadcast area identification code to contain the at least one target base station. The broadcast area identification code corresponds to the broadcast service. The transmission unit is configured to selectively transmit a command for adding a new broadcast area identification code to the at least one target base station in the broadcast service base station list so that the at least one target base station records the broadcast area identification code to receive the broadcast service corresponding to the broadcast area identification code.

The above and other aspects of the disclosure will become better understood with regards to the following detailed description of the preferred but non-limiting embodiment(s). The following description is made with reference to the accompanying drawings.

Figure 1:
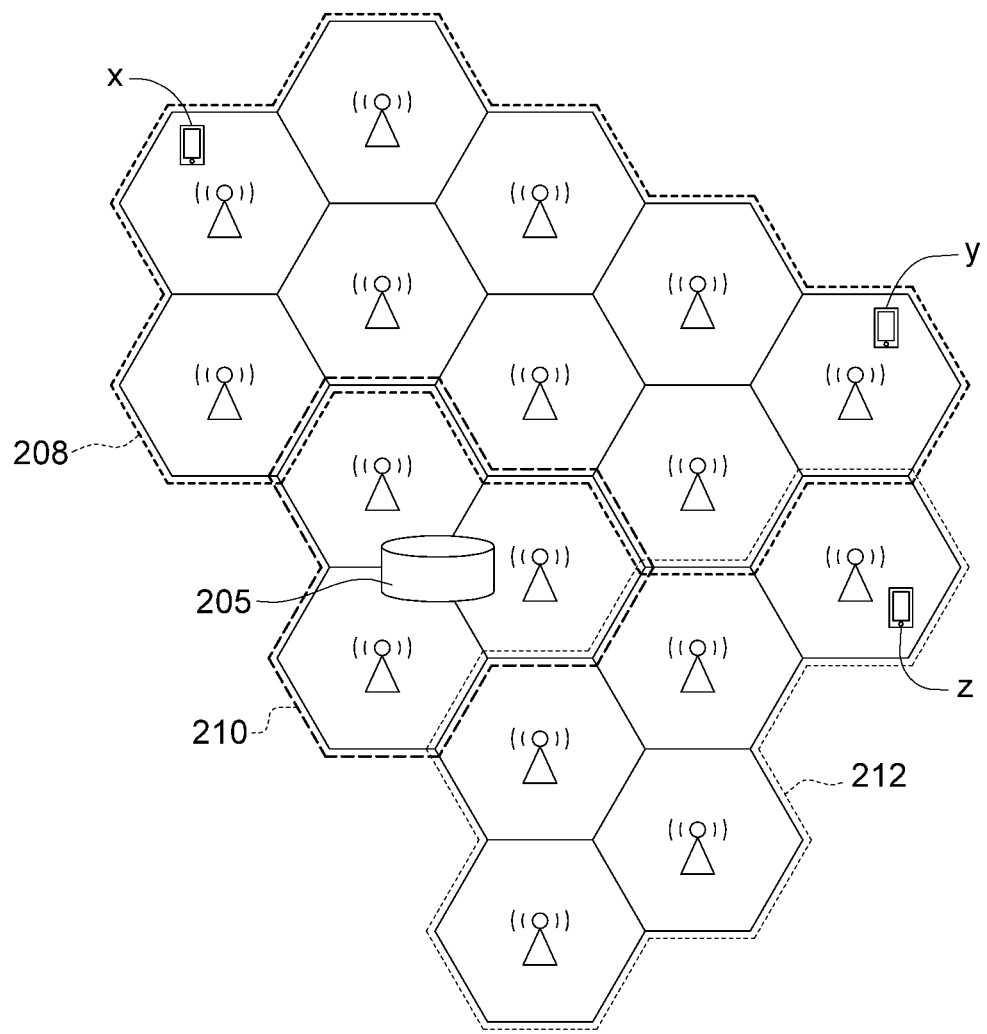
FIG. 1 is a schematic diagram of broadcasting a program using multimedia broadcast/multicast service (MBMS) technology under the 4G long-term evolution (LTE) mobile network architecture.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
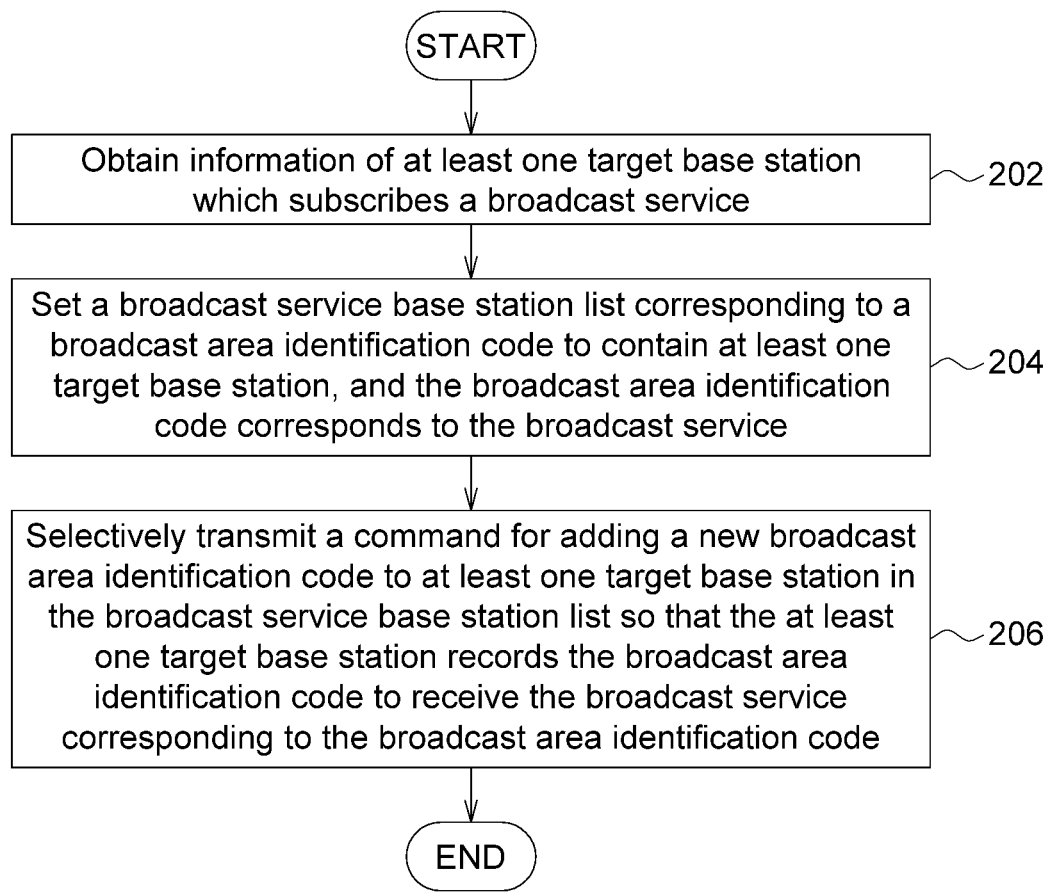
FIG. 2 is a flowchart of a method for dynamically adjusting a broadcast area according to an embodiment of the present disclosure.

Referring to FIG. 2, a flowchart of a method for dynamically adjusting a broadcast area according to an embodiment of the present disclosure is shown. In step 202, information of at least one target base station which subscribes a broadcast service is obtained. In step 204, a broadcast service base station list corresponding to a broadcast area identification code is set to contain at least one target base station. The broadcast area identification code corresponds to the broadcast service. In step 206, a command for adding a new broadcast area identification code is selectively transmitted to the at least one target base station in the broadcast service base station list so that the at least one target base station records the broadcast area identification code to receive the broadcast service corresponding to the broadcast area identification code. The said broadcast area can be an MBMS broadcast area.

Figure 3A:
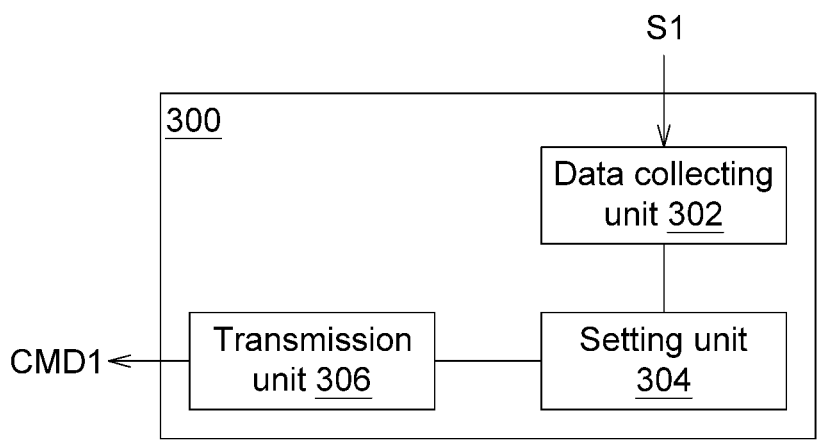
FIG. 3A is a block diagram of a device for dynamically adjusting a broadcast area according to an embodiment of the present disclosure.

Referring to FIG. 3A, a block diagram of a device 300 for dynamically adjusting a broadcast area according to an embodiment of the present disclosure is shown. The device 300 for dynamically adjusting a broadcast area can be implemented by a broadcast area management server (BAMS). The device 300 for dynamically adjusting a broadcast area includes a data collecting unit 302, a setting unit 304 and a transmission unit 306. The data collecting unit 302 is configured to obtain information S1 of at least one target base station which subscribes a broadcast service. The setting unit 304 is configured to set a broadcast service base station list corresponding to a broadcast area identification code to contain at least one target base station. The broadcast area identification code corresponds to the broadcast service. The transmission unit 306 is configured to selectively transmit a command CMD1 for adding a new broadcast area identification code to the at least one target base station in the broadcast service base station list, so that the at least one target base station records the broadcast area identification code to receive the broadcast service corresponding to the broadcast area identification code.

Figure 3B:
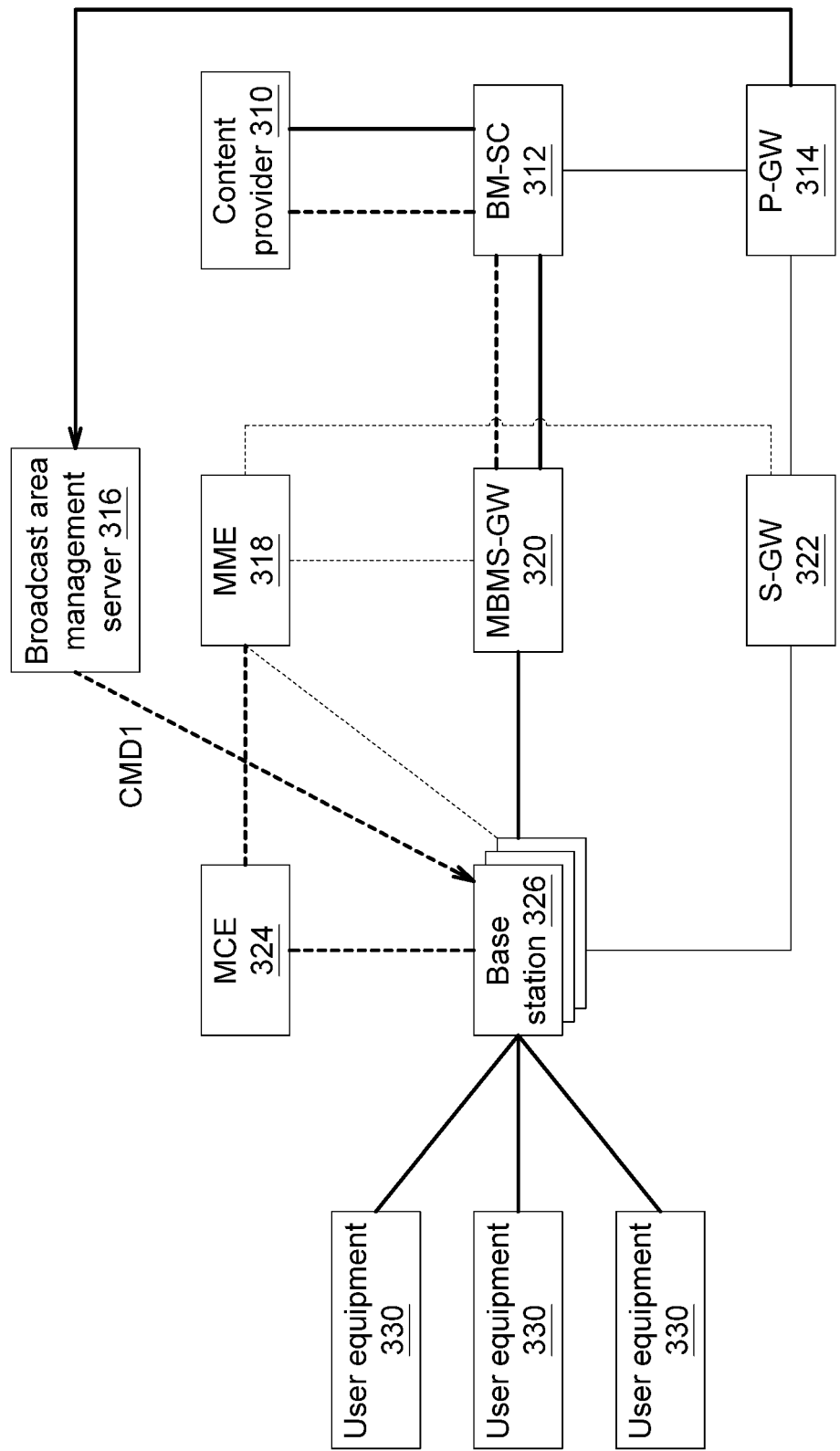
FIG. 3B is a block diagram of an example of the mobile network containing the device for dynamically adjusting a broadcast area of FIG. 3A.

Referring to FIG. 3B, a block diagram of an example of the mobile network containing the device for dynamically adjusting a broadcast area of FIG. 3A is shown. The present embodiment is exemplified by 4G long-term evolution (LTE) mobile network architecture 360, but the disclosure is not limited thereto. In FIG. 3B, the device 300 for dynamically adjusting a broadcast area can be implemented by a broadcast area management server 316, for example. The 4G long-term evolution (LTE) mobile network architecture 360 includes a packet data network gateway (P-GW) 314, a serving gateway (S-GW) 322, a mobility management entity (MME) 318. In the long-term evolution (LTE) mobile network, relevant elements of the enhanced multimedia broadcast/multicast service (eMBMS) broadcast function include a broadcast/multicast service center (BM-SC) 312, a multimedia broadcast/multicast service gateway (MBMS-GW) 320, and a multicell/multicast coordination entity (MCE) 324. The broadcast/multicast service center 312, being an access point between the core network and the content provider 310, announces broadcast content according to service content and service type and manages user accounts, broadcast area identification codes setting, security key, subscriptions and charges.

Telecom operators pre-install the base stations corresponding to the broadcast area identification codes, and the content provider 310 provides to the broadcast/multicast service center 312: (1) the broadcast service content, such as program content; and (2) the target locations of the user equipment (UE) 330 currently receiving the program through broadcast. The broadcast/multicast service center 312 converts the target locations of the broadcast receivers to suitable broadcast area identification codes, and then transmits the broadcast service content (such as program content) to the user equipment (UE) receiving broadcast by using the mobile network broadcast technology.

In step 202 of FIG. 2, information of at least one target base station which subscribes a broadcast service is obtained. The broadcast area management server 316 (such as data collecting unit 302 of the broadcast area management server 316 of FIG. 3A) receives at least one consumption report of at least one user equipment (UE), each consumption report records a user equipment code UE_ID, an affiliated base station code BS_ID, and a program code PR_ID of a corresponding user equipment (UE), and information of at least one target base station which subscribes the broadcast service is obtained according to the at least one consumption report of the at least one user equipment (UE). Each consumption report further selectively records a consumption type of the corresponding user equipment (UE) to record whether the service corresponding to the program code is obtained through broadcast, multicast, or unicast. In the following description, the broadcast service is exemplified by program broadcast service.

Figure 4:
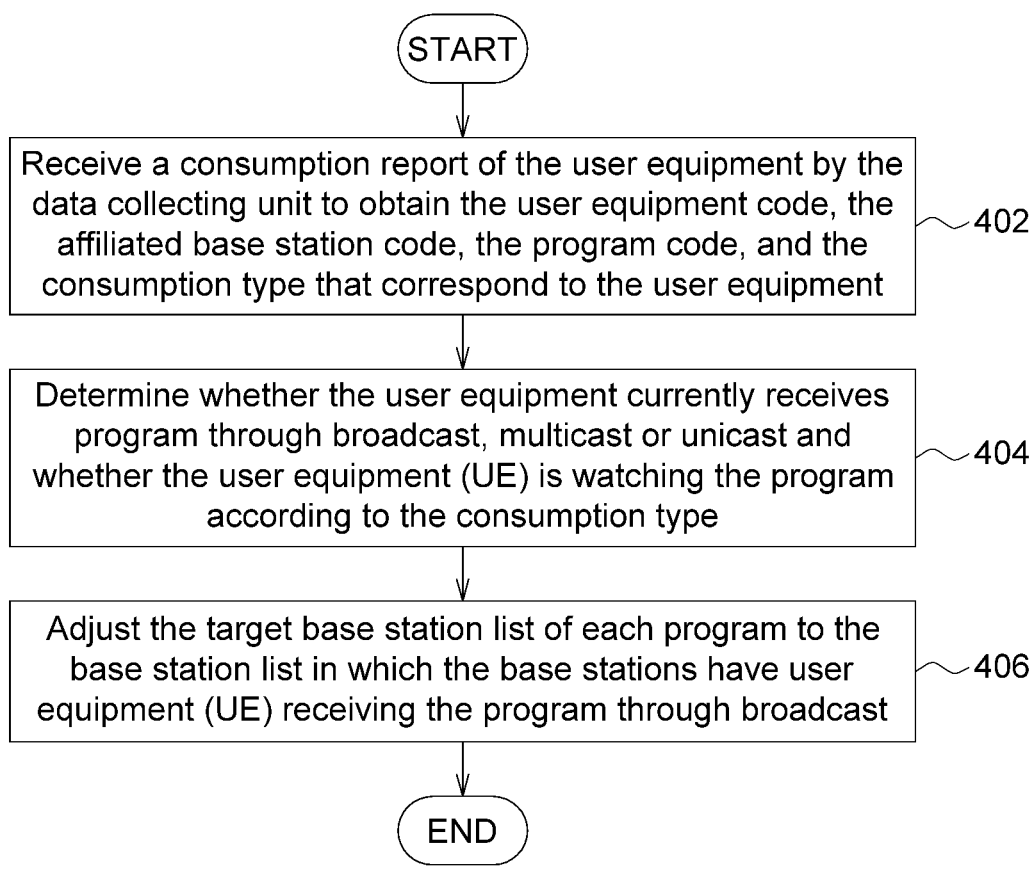
FIG. 4 is an example of a flowchart of detailed procedures of the step 202 of FIG. 2.

Referring to FIG. 4, an example of a flowchart of detailed procedures of the step 202 of FIG. 2 is shown. In step 402, a consumption report of the user equipment (UE) is received by the data collecting unit 302. The user equipment code UE_ID, the affiliated base station code BS_ID, the program code PR_ID, and the consumption type that correspond to the user equipment (UE) are obtained from the consumption report. In step 404, whether the user equipment (UE) currently receives program through broadcast, multicast or unicast and whether the user equipment (UE) is watching the program are determined according to the consumption type. In step 406, the target base station list of each program is adjusted to the base station list whose base stations have user equipment (UE) receiving the program through broadcast.

According to the present embodiment, the broadcast area management server 316 and the packet data network gateway 314 communicate with a number of base stations 326, and the broadcast area management server 316 periodically receives a number of consumption reports of a number of user equipments (UEs) from the packet data network gateway 314. Table 1 is an example of consumption report for each of user equipments (UEs), but the disclosure is not limited thereto. The consumption report includes user equipment code UE_ID, affiliated base station code BS_ID, program code PR_ID, and consumption type. The user equipment code UE_ID is for identifying the user equipment (UE). The affiliated base station code BS_ID corresponds to the code of the base station BS where the user equipment (UE) is currently located. The program code PR_ID corresponds to the program code received by the user equipment (UE). The consumption type indicates whether the program is transmitted to the user equipment through broadcast, multicast, or unicast. As listed in Table 1, the user equipment code UE_ID of the first user equipment (UE1) is UE #1, the affiliated base station code BS_ID is BS #1, the received program code PR_ID is PR #3, and the consumption type is unicast. Based on the parameters of relevant information, such as program code and the consumption type, the broadcast area management server 316 determines whether the user equipment (UE) currently receives program through broadcast, multicast, or unicast and whether the user equipment is watching the program.

TABLE 1

| User Equipment Code | Affiliated Base Station Code | Program Code | Consumption Type |
|---|---|---|---|
| UE#1 | BS#1 | PR#3 | unicast |

Referring to Table 2, an example of a consumption report summary list obtained by the broadcast area management server 316 from the summary of a number of consumption reports is shown, but the disclosure is not limited thereto. The broadcast area management server 316 obtains information of at least one target base station which subscribes the broadcast service according to these information parameters. For example, the broadcast area management server 316 obtains a base station list corresponding to the specific broadcast service or program currently being received by the user equipment (UE) through broadcast.

TABLE 2

| User Equipment Code | Affiliated Base Station Code | Program Code | Consumption Type |
|---|---|---|---|
| UE#1 | BS#1 | PR#1 | broadcast |
| UE#2 | BS#2 | PR#1 | broadcast |
| UE#3 | BS#3 | PR#2 | unicast |
| UE#4 | BS#4 | PR#3 | unicast |

Referring to Table 3, a base station list corresponding to the program code PR_ID currently being received by the user equipment through broadcast is shown. The broadcast area management server 316 summarizes Table 2 to obtain the base station list, and the program code PR_ID is PR #1, but the disclosure is not limited thereto. As listed in Table 3, the user equipments (UEs) in the first base station BS #1 and the second base station BS #2 are receiving the first program with a program code PR_ID of PR #1 through broadcast. Thus, for each program or broadcast service (containing the first program) being broadcast, the broadcast area management server 316 adjusts the target base station list to a base station list of the base stations where the program is currently being received by the user equipment through broadcast. In the present embodiment, step 202 is completed through performing steps 402 to 406. In step 202, the information S1 of at least one target base station which subscribes a broadcast service is exemplified by the base station list of the base stations where the user equipments are receiving the program through broadcast, but the disclosure is not limited thereto.

TABLE 3

| Program Code | Target Base Station List |
|---|---|
| PR#1 | BS#1, BS#2 |

Detailed procedures of the step 204 of FIG. 2 of setting a broadcast service base station list corresponding to a broadcast area identification code to contain at least one target base station in the broadcast service base station list are disclosed below. The broadcast area identification code corresponds to the broadcast service. Before the step 202 of FIG. 2 of obtaining information of at least one target base station which subscribes a broadcast service is performed, when the broadcast service is not bound with any broadcast area identification codes, then the broadcast area management server 316 sets an unused broadcast area identification code as the broadcast area identification code, and binds the broadcast area identification code with the broadcast service and the information of at least one target base station. On the other hand, when the broadcast area management server 316 binds the broadcast area identification code with the broadcast service and at least one target base station, the broadcast area management server 316 can selectively set a lifetime of the broadcast area identification code. On the other hand, before the step 202 of FIG. 2 of obtaining information of at least one target base station which subscribes a broadcast service is performed, when the broadcast service is already bound with the broadcast area identification code and the program base station list corresponding to the broadcast area identification code is consistent with the information of at least one target base station, then the broadcast area management server 316 keeps the broadcast area identification code and the program base station list. On the other hand, before the step 202 of FIG. 2 of obtaining the information S1 of at least one target base station which subscribes a broadcast service is performed, when the broadcast service is already bound with the broadcast area identification code and the program base station list corresponding to the broadcast area identification code is inconsistent with the information of at least one target base station, then the broadcast area management server 316 keeps the broadcast area identification code and sets the program base station list to be consistent with the information of at least one target base station. When the broadcast area identification code is kept, the broadcast area management server 316 can selectively extend the lifetime of the broadcast area identification code at the same time. When the lifetime of the broadcast area identification code expires, the broadcast service, the broadcast service base station list, and the lifetime that correspond to the broadcast area identification code are removed.

Figure 5:
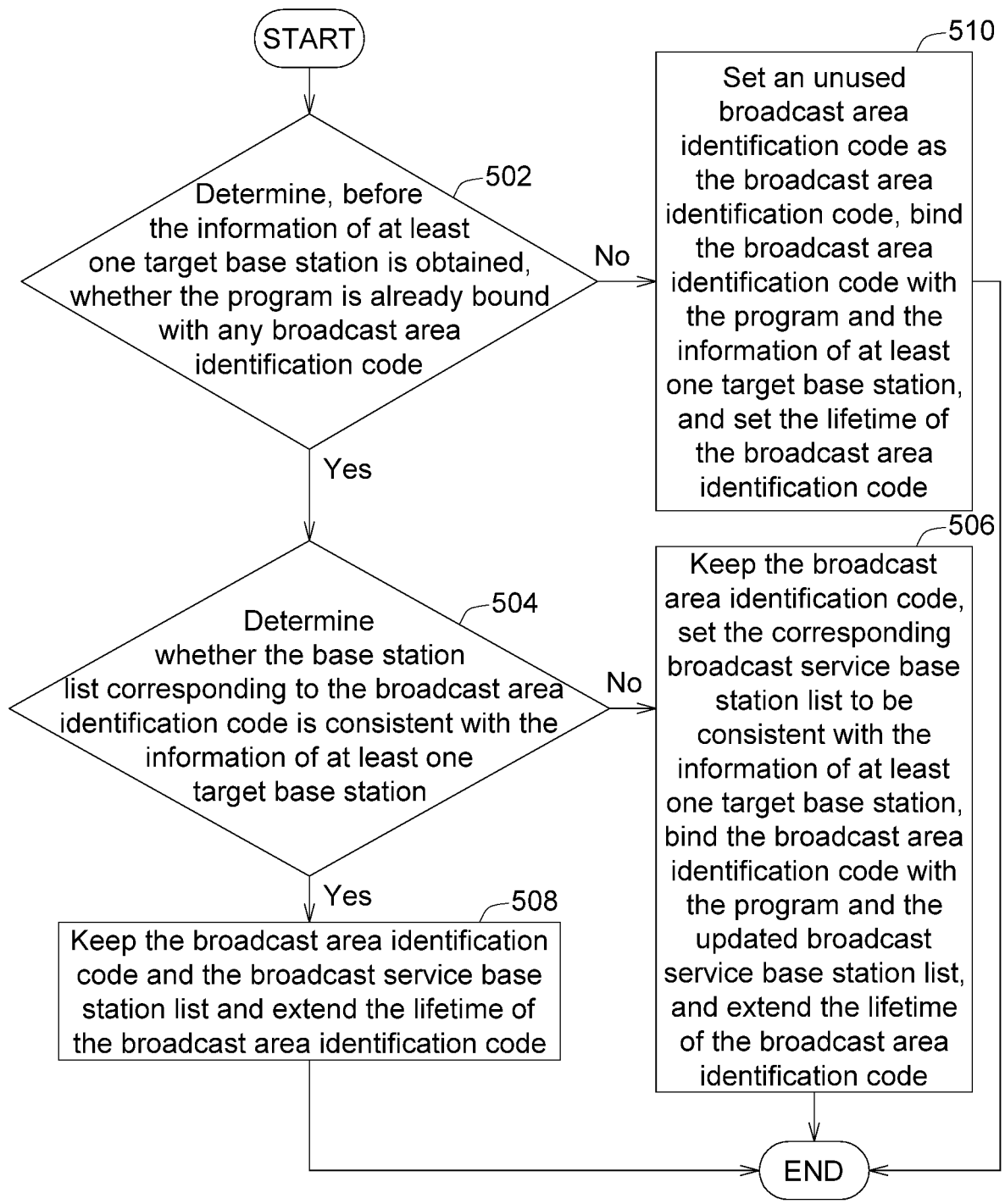
FIG. 5 is an example of a flowchart of detailed procedures of the step 204 of FIG. 2.

Referring to FIG. 5, an example of a flowchart of detailed procedures of the step 204 of FIG. 2 is shown. In step 502, before the information of at least one target base station is obtained, whether the program is already bound with any broadcast area identification codes is determined. When it is determined that the program is already bound with the broadcast area identification code, then the method proceeds to step 504. When it is determined that the program is not bound with any broadcast area identification codes, then the method proceeds to step 510. In step 504, whether the base station list corresponding to the broadcast area identification code is consistent with the information of at least one target base station is determined. When it is determined that the two are consistent, then the method proceeds to step 508. When it is determined that the two are inconsistent, then the method proceeds to step 506. In step 506, the broadcast area identification code is kept, the corresponding broadcast service base station list is set to be consistent with the information of at least one target base station, the broadcast area identification code is bound with the program and the updated broadcast service base station list, and the lifetime of the broadcast area identification code is extended. In step 508, the broadcast area identification code and the broadcast service base station list are kept, and the lifetime of the broadcast area identification code is extended. In step 510, an unused broadcast area identification code is set as the broadcast area identification code, the broadcast area identification code is bound with the program and the information of at least one target base station, and the lifetime of the broadcast area identification code is set.

Referring to Table 4, a table of program and broadcast area stored in the broadcast area management server 316 is exemplified, but the disclosure is not limited thereto. As listed in Table 4, the first program with a program code PR #1 is already bound with the first broadcast area identification code BCArea #1, the broadcast service base station list corresponding to the first broadcast area identification code BCArea #1 contains the first base station BS #1 and the second base station BS #2, and the first broadcast area identification code BCArea #1 corresponds to a lifetime of 15 minutes. The lifetime can be the expected remaining broadcast time of the first program, that is, 15 minutes, but the disclosure is not limited thereto.

TABLE 4

| Broadcast Area Identification Code | Program Code | Broadcast Service Base Station List | Lifetime |
|---|---|---|---|
| BCArea#1 | PR#1 | BS#1, BS#2 | 15 minutes |

Detailed procedures of the flowchart of FIG. 5 are exemplified by several scenarios below. (1) Scenario 1: At the earlier first time point T1, neither the first user equipment(s) UE1 within the broadcasting range of the first base station BS #1 nor the second user equipment(s) UE2 within the broadcasting range of the second base station BS #2 are watching the first program with a program code PR_ID of PR #1 through broadcast. Meanwhile, as listed in Tables 5 to 6, the target base station list corresponding to the first program with a program code PR_ID of PR #1 does not contain the first base station BS #1 or the second base station BS #2, and the column of the target base station list can be blank; since the first broadcast area identification code BCArea #1 is not bound with the first program, the column of the program code can be blank.

TABLE 5

| Program Code | Target Base Station List |
|---|---|
| PR#1 | |

TABLE 6

| Broadcast Area Identification Code | Program Code | Broadcast Service Base Station List | Lifetime |
|---|---|---|---|
| BCArea#1 | | | |

Then, at the second time point T2, the first user equipment(s) UE1 within the broadcasting range of the first base station BS #1 and the second user equipment(s) UE2 within the broadcasting range of the second base station BS #2 start to watch the first program through broadcast. After the second time point T2, the broadcast area management server 316 receives and summarizes the consumption report of the first user equipment(s) UE1 and the second user equipment(s) UE2 again, and performs the steps 402 to 406 of FIG. 4 to obtain the information of at least one target base station which subscribes a broadcast service and to adjust the target base station list corresponding to the first program to a base station list of the base stations where the program is currently being received by the user equipments through broadcast. The broadcast area management server 316 changes Table 5 as Table 7, and changes the target base station list corresponding to the first program with a program code PR_ID of PR #1 to contain the first base station BS #1 and the second base station BS #2. The target base station list is a list of base stations corresponding to the program currently being received by the user equipments through broadcast.

TABLE 7

| Program Code | Target Base Station List |
|---|---|
| PR#1 | BS#1, BS#2 |

As listed in Table 6, before the second time point T2, since the first broadcast area identification code BCArea #1 is not bound with the first program with a program code PR_ID of PR #1, the determination result of step 502 performed by the broadcast area management server 316 is that the first program is not bound with any broadcast area identification code, and the method proceeds to step 510. In step 510, an unused broadcast area identification code is set as the broadcast area identification code, the broadcast area identification code is bound with the program and the information of at least one target base station, and the lifetime of the broadcast area identification code is set. The broadcast area management server 316 changes Table 6 to Table 8 to cause the first broadcast area identification code BCArea #1 to be bound with the first program (program code PR_ID is PR #1), changes the broadcast service base station list corresponding to the first broadcast area identification code BCArea #1 to contain the first base station BS #1 and the second base station BS #2, and sets the lifetime of the first broadcast area identification code BCArea #1 to the expected remaining broadcast time of the first program, that is, 40 minutes, for example.

TABLE 8

| Broadcast Area Identification Code | Program Code | Broadcast Service Base Station List | Lifetime |
|---|---|---|---|
| BCArea#1 | PR#1 | BS#1, BS#2 | 40 minutes |

(2) Scenario 2: Continue with the state of Table 8, at the third time point T3, the first user equipment(s) UE1 within the broadcasting range of the first base station BS #1 and the second user equipment(s) UE2 within the broadcasting range of the second base station BS #2 still receive the first program through broadcast, and the third user equipment(s) UE3 within the broadcasting range of the third base station BS #3 still does not receive the first program through broadcast. After the third time point T3, the broadcast area management server 316 receives and summarizes the consumption report of the first user equipment(s) UE1, the second user equipment(s) UE2 and the third user equipment(s) UE3 again, and performs the steps 402 to 406 of FIG. 4, detailed procedures of step 202 of obtaining the information of at least one target base station which subscribes a broadcast service, as listed in Tables 7 to 8. Since the determination result of step 502 performed by the broadcast area management server 316 is that the first program is already bound with the first broadcast area identification code BCArea #1, the method proceeds to step 504. In step 504, whether the base station list corresponding to the broadcast area identification code is consistent with the information of at least one target base station is determined. When it is determined that the two are consistent, then the method proceeds to step 508. In step 508, the first broadcast area identification code BCArea #1 and the broadcast service base station list containing the first base station BS #1 and the second base station BS #2 are kept, and the lifetime of the first broadcast area identification code BCArea #1 is extended to the expected remaining broadcast time of the first program, that is, 50 minutes, for example. The broadcast area management server 316 changes Table 8 to Table 9.

TABLE 9

| Broadcast Area Identification Code | Program Code | Broadcast Service Base Station List | Lifetime |
|---|---|---|---|
| BCArea#1 | PR#1 | BS#1, BS#2 | 50 minutes |

(3) Scenario 3: Continue with the state of Table 9, at the fourth time point T4, the first user equipment(s) UE1 within the broadcasting range of the first base station BS #1 and the second user equipment(s) UE2 within the broadcasting range of the second base station BS #2 receive the first program through broadcast, and the third user equipment(s) UE3 within the broadcasting range of the third base station BS #3 just start to receive the first program with a program code PR #1 through broadcast. After the fourth time point T4, the broadcast area management server 316, which receives and summarizes the consumption report of the first user equipment(s) UE1, the second user equipment(s) UE2 and the third user equipment(s) UE3 again, performs steps 402 to 406 of FIG. 4 to obtain the information of at least one target base station which subscribes a broadcast service, changes Table 7 to Table 10, and changes the target base station list corresponding to the first program with a program code PR_ID of PR #1 to a list of base stations corresponding to the program currently being received by the user equipments through broadcast. That is, the target base station list corresponding to the first program with a program code PR_ID of PR #1 is changed to a list containing the first base station BS #1, the second base station BS #2 and the third base station BS #3.

TABLE 10

| Program Code | Target Base Station List |
|---|---|
| PR#1 | BS#1, BS#2, BS#3 |

Since the determination result of step 502 performed by the broadcast area management server 316 is that the first program is already bound with the first broadcast area identification code BCArea #1, the method proceeds to step 504. In step 504, whether the base station list corresponding to the broadcast area identification code is consistent with the information of at least one target base station is determined. When it is determined that the two are inconsistent, the method proceeds to step 506, the broadcast area identification code is kept, the corresponding broadcast service base station list is set to be consistent with the information of at least one target base station, the broadcast area identification code are set to be bound with the program and the updated broadcast service base station list, and the lifetime of the broadcast area identification code is extended. Thus, the broadcast area management server 316 keeps the first broadcast area identification code BCArea #1, changes the corresponding broadcast service base station list to contain the first base station BS #1, the second base station BS #2 and the third base station BS #3, and extends the lifetime of the first broadcast area identification code BCArea #1 to the expected remaining broadcast time of the first program, that is, 60 minutes, for example. The broadcast area management server 316 changes Table 9 to Table 11.

TABLE 11

| Broadcast Area Identification Code | Program Code | Broadcast Service Base Station List | Lifetime |
|---|---|---|---|
| BCArea#1 | PR#1 | BS#1, BS#2, BS#3 | 60 minutes |

Details of the step 206 of FIG. 2 are disclosed below. When a command CMD1 for adding a new broadcast area identification code is selectively transmitted to the at least one target base station in the broadcast service base station list so that the at least one target base station records the specific broadcast area identification code to receive the broadcast service corresponding to the specific broadcast area identification code, the following steps are performed. Suppose the at least one target base station contains a first base station having a first affiliated broadcast area list configured to record the broadcast area(s) to which the first base station currently belongs. Before the step 206 of selectively transmitting a command for adding the new broadcast area identification code is performed, the broadcast area management server 316 further checks the first base station to determine whether the first affiliated broadcast area list of the first base station includes the specific broadcast area identification code. When it is determined that the first affiliated broadcast area list of the first base station does not contain the specific broadcast area identification code, the command for adding the specific broadcast area identification code is transmitted to the first base station for adding the specific broadcast area identification code to the first affiliated broadcast area list. On the other hand, suppose the at least one target base station contains a second base station having a second affiliated broadcast area list configured to record the broadcast area(s) to which the second base station currently belongs. When the broadcast area management server 316 performs step 206, the broadcast area management server 316 further periodically updates the information of at least one target base station which subscribes the broadcast service. When the second base station of the at least one target base station no longer subscribes the broadcast service, the second base station is deleted from the broadcast service base station list, and a command for deleting the corresponding broadcast area identification code from the second affiliated broadcast area list is transmitted to the second base station to stop the second base station from receiving the broadcast service corresponding to the broadcast area identification code.

Figure 6:
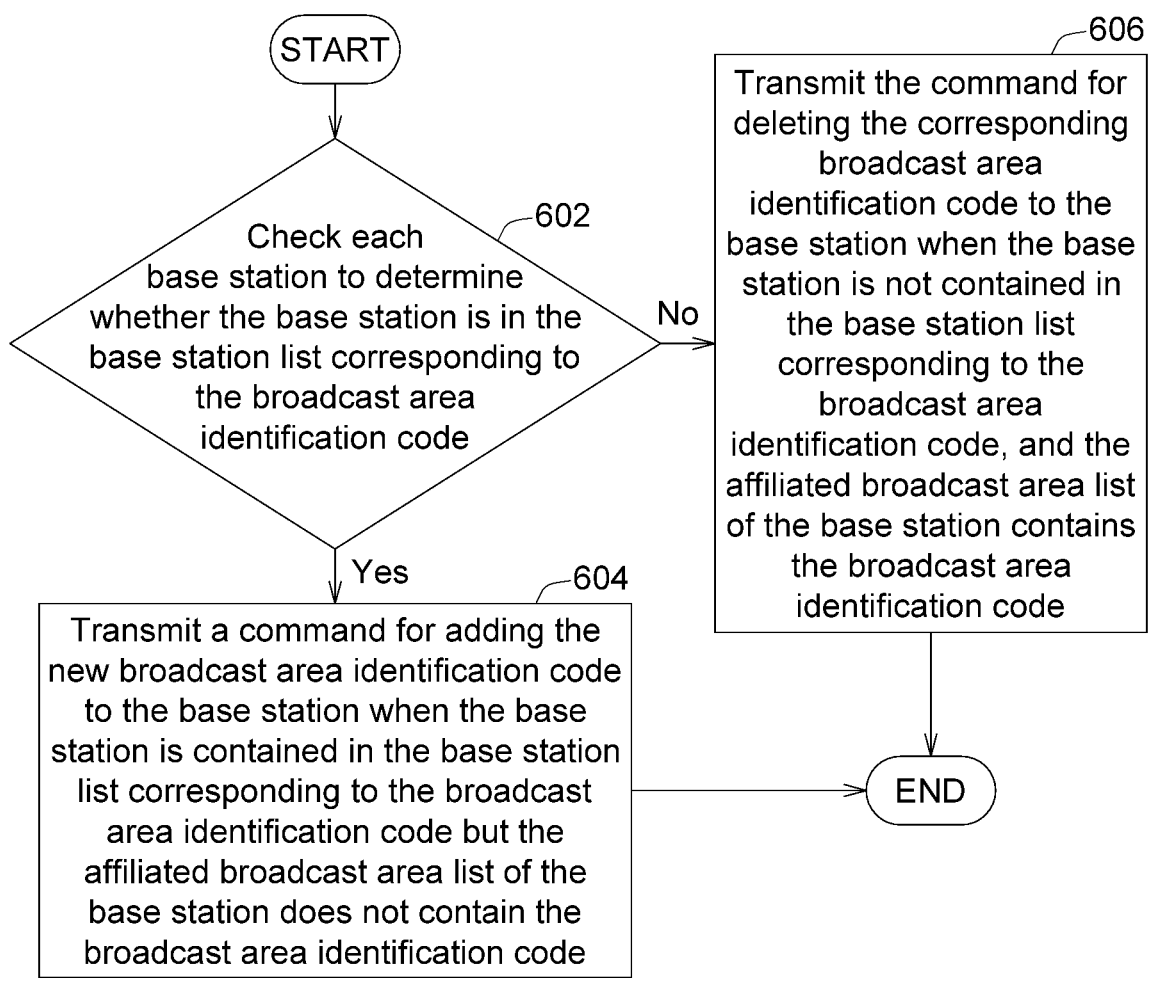
FIG. 6 is an example of a flowchart of detailed procedures of the step 206 of FIG. 2.

Referring to FIG. 6, an example of a flowchart of detailed procedures of the step 206 of FIG. 2 is shown. In step 602, each base station is checked to determine whether the base station is in the base station list corresponding to the broadcast area identification code. When the determination is Yes, then the method proceeds to step 604. When the determination is No, then the method proceeds to step 606. In step 604, when the base station is contained in the base station list corresponding to the broadcast area identification code but the affiliated broadcast area list of the base station does not contain the broadcast area identification code, a command for adding the new broadcast area identification code is transmitted to the base station. In step 606, when the base station is not contained in the base station list corresponding to the broadcast area identification code and the affiliated broadcast area list of the base station contains the broadcast area identification code, the command for deleting the corresponding broadcast area identification code is transmitted to the base station.

Detailed procedures of the flowchart of FIG. 6 are exemplified by Table 9 for scenario 2 and Table 11 for scenario 3.

(1) When it is under Scenario 2 and after the third time point T3, the table of program and broadcast area is changed to Table 9, the first user equipment(s) UE1 within the broadcasting range of the first base station BS #1 and the second user equipment(s) UE2 within the broadcasting range of the second base station BS #2 still watch the first program through broadcast, but the third user equipment(s) UE3 within the broadcasting range of the third base station BS #3 do not watch the first program with a program code PR #1 through broadcast. Each base station has a respective affiliated broadcast area list which records the broadcast area to which the base station currently belongs. At the third time point T3, suppose the first affiliated broadcast area list of the first base station BS #1 contains the first broadcast area identification code BCArea #1, the second affiliated broadcast area list of the second base station BS #2 contains the first broadcast area identification code BCArea #1, but the third affiliated broadcast area list of the third base station BS #3 does not contain the first broadcast area identification code BCArea #1.

Meanwhile, the first affiliated broadcast area list of the first base station BS #1 and the second affiliated broadcast area list of the second base station BS #2 (containing the first broadcast area identification code BCArea #1) are consistent with the broadcast service base station list of Table 9 (containing the first base station BS #1 and the second base station BS #2) corresponding to the first broadcast area identification code BCArea #1. Therefore, when the broadcast area management server 316 performs steps 602 and 604 to check and determine that the first affiliated broadcast area list and the second affiliated broadcast area list contain the first broadcast area identification code BCArea #1, the transmission unit 306 does not transmit the command for adding the broadcast area identification code BCArea #1 to the first base station BS #1 and the second base station BS #2.

(2) Scenario 3: the first user equipment(s) UE1 within the broadcasting range of the first base station BS #1 and the second user equipment(s) UE2 within the broadcasting range of the second base station BS #2 are watching the first program through broadcast, and the third user equipment(s) UE3 within the broadcasting range of the third base station BS #3 start to watch the first program with a program code PR #1 through broadcast at the fourth time point T4. After the fourth time point T4, suppose the table of program and broadcast area is changed to Table 11, but the third affiliated broadcast area list of the third base station BS #3 has not been changed. Meanwhile, the third affiliated broadcast area does not contain the first broadcast area identification code BCArea #1.

Meanwhile, the third affiliated broadcast area list of the third base station BS #3 (not containing the first broadcast area identification code BCArea #1) is inconsistent with the broadcast service base station list of Table 11 (containing the first base station BS #1, the second base station BS #2, and the third base station BS #3) corresponding to the first broadcast area identification code BCArea #1. Therefore, after the fourth time point T4, when the broadcast area management server 316 performs steps 602 and 604 to check and determine that the third affiliated broadcast area list does not contain the first broadcast area identification code BCArea #1, the transmission unit 306 transmits the command for adding the broadcast area identification code BCArea #1 to the third base station BS #3 to make the third affiliated broadcast area list contain the first broadcast area identification code BCArea #1.

On the other hand, after the broadcast area management server 316 performs step 204 to set a broadcast service base station list corresponding to a broadcast area identification code (corresponding to the broadcast service) to contain at least one target base station, the broadcast area identification code is kept, and the lifetime of the broadcast area identification code is extended. When the lifetime of the broadcast area identification code expires, the broadcast service, the broadcast service base station list, and the lifetime that correspond to the broadcast area identification code are removed. Detailed procedures of removing the broadcast service, the broadcast service base station list, and the lifetime that correspond to the broadcast area identification code when the lifetime of the broadcast area identification code expires are disclosed below.

Figure 7:
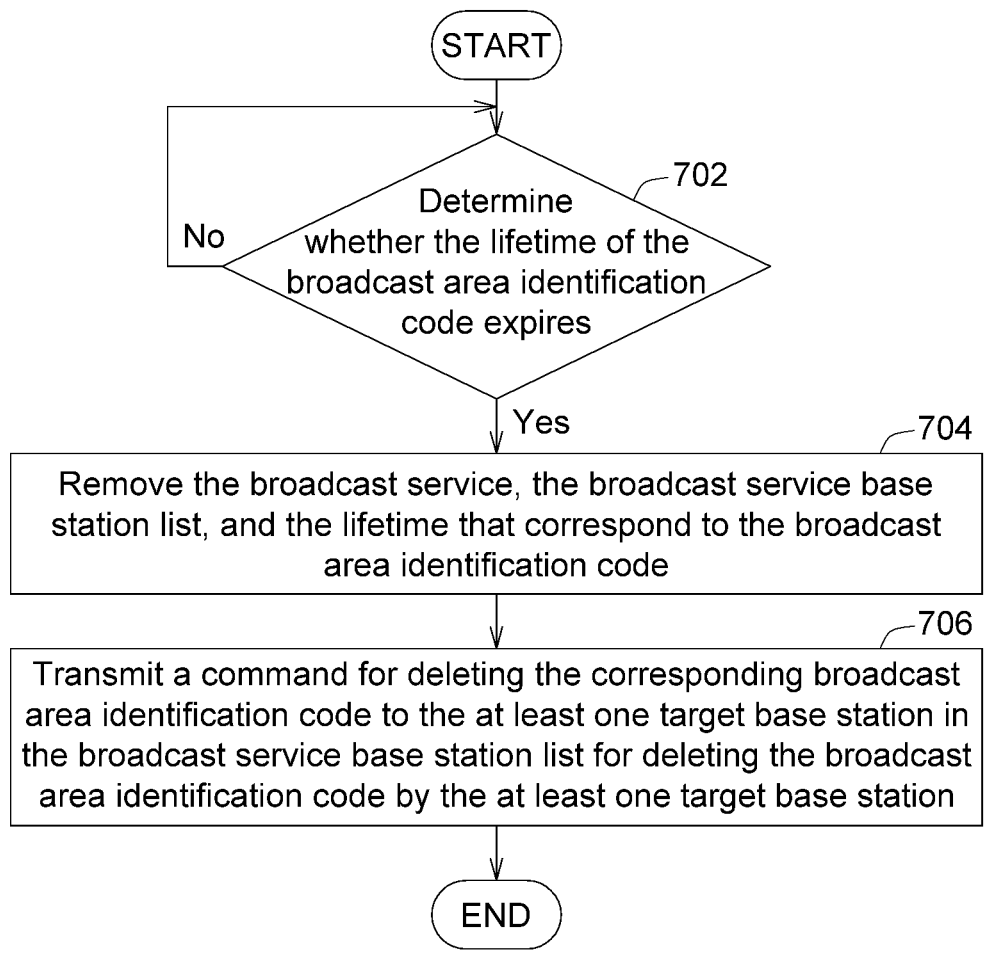
FIG. 7 is a flowchart of a method for dynamically adjusting a broadcast area when the lifetime of a broadcast area identification code expires according to an embodiment of the present disclosure.

Referring to FIG. 7, a flowchart of a method for dynamically adjusting a broadcast area when the lifetime of a broadcast area identification code expires according to an embodiment of the present disclosure is shown. In the step 702 of FIG. 7, whether the lifetime of the broadcast area identification code expires is determined. When it is determined that the lifetime already expires, then the method proceeds to step 704. In step 704, the broadcast service, the broadcast service base station list, and the lifetime that correspond to the broadcast area identification code are removed, and the method proceeds to step 706. In step 706, a command for deleting the corresponding broadcast area identification code is transmitted to the at least one target base station in the broadcast service base station list for deleting the broadcast area identification code by the at least one target base station.

Detailed procedures of the flowchart of FIG. 7 are exemplified by Table 9 for scenario 2. After the lifetime in the table of program and broadcast area as listed in Table 9 expires and the determination of step 702 performed by the broadcast area management server 316 is Yes, the method proceeds to steps 704 and 706, the broadcast service, the broadcast service base station list, and the lifetime that correspond to the first broadcast area identification code BCArea #1 are removed and the table of program and broadcast area as listed in Table 12 is obtained. A command for deleting the first broadcast area identification code BCArea #1 to all base stations (that is, the first base station BS #1 and the second base station BS #2) of the broadcast service base station list corresponding to the first broadcast area identification code BCArea #1 before the lifetime expires is transmitted by the transmission unit 306. The first affiliated broadcast area list of the first base station BS #1 and the second affiliated broadcast area list of the second base station BS #2 are caused to no longer contain the first broadcast area identification code BCArea #1. On the other hand, the broadcast area management server 316 can also perform the steps 602 and 606 of FIG. 6. In step 602, whether each base station is no longer contained in the cleared broadcast service base station list corresponding to which the first broadcast area identification code BCArea #1 is checked by the broadcast area management server 316. In step 606, for all the base stations of the affiliated broadcast area list that contain the first broadcast area identification code BCArea #1, such as the first base station BS #1 and the second base station BS #2, a command for deleting the first broadcast area identification code BCArea #1 is transmitted to these base stations by the broadcast area management server 316.

TABLE 12

| Broadcast Area Identification Code | Program Code | Broadcast Service Base Station List | Lifetime |
|---|---|---|---|
| BCArea#1 | | | |

Figure 8A:
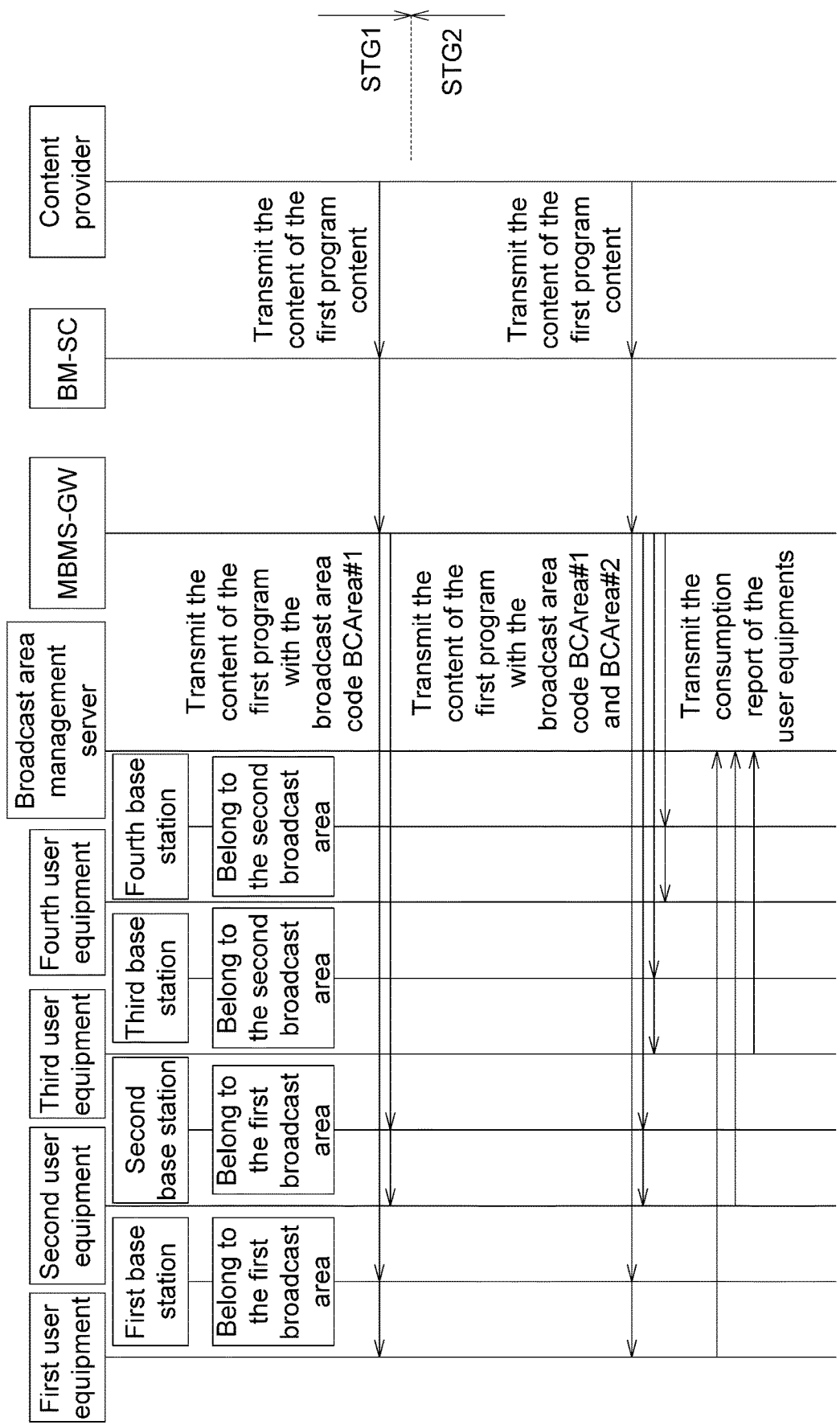
FIGS. 8A to 8C are sequence diagrams of adding a new base station to a broadcast area according to the present disclosure.
Figure 8B:
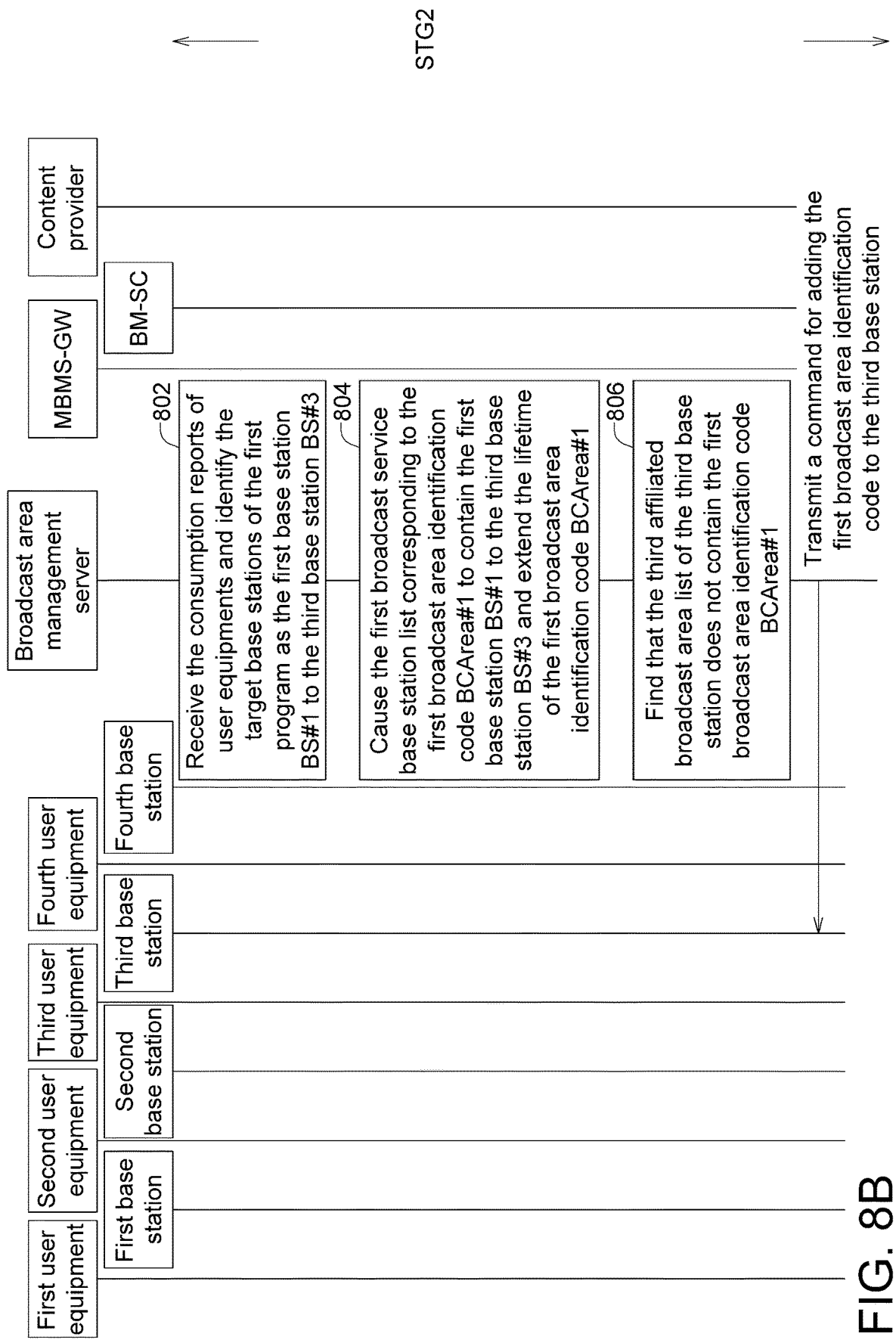
Figure 8C:
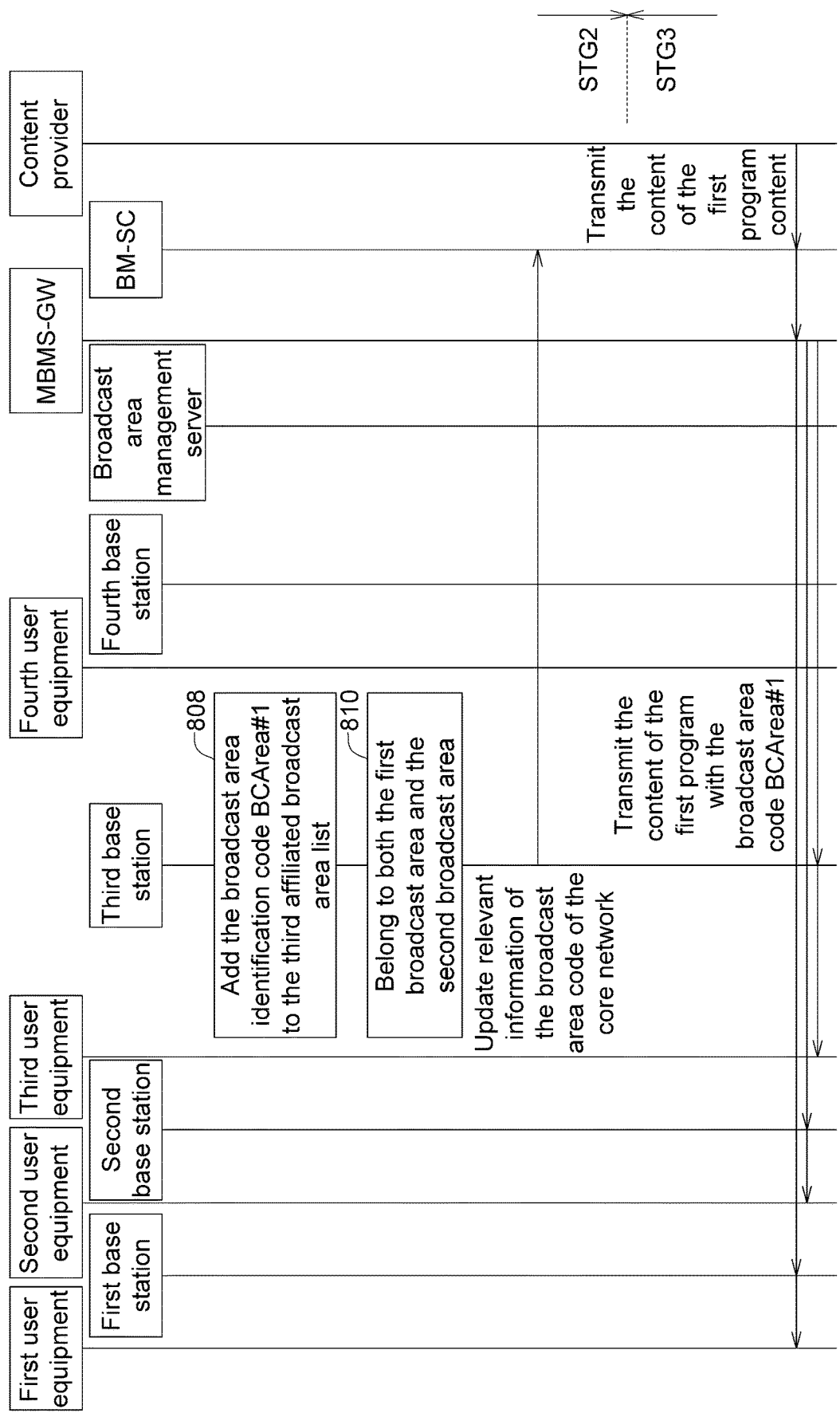
Figure 9A:
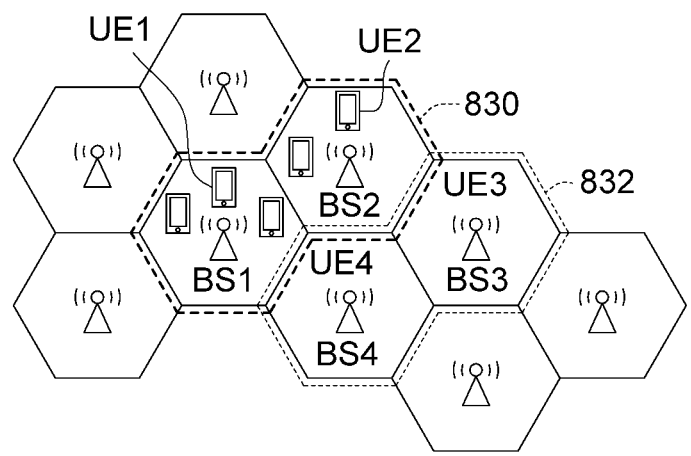
FIGS. 9A to 9B are schematic diagrams before and after a new base station is added to a broadcast area of FIGS. 8A to 8C.
Figure 9B:
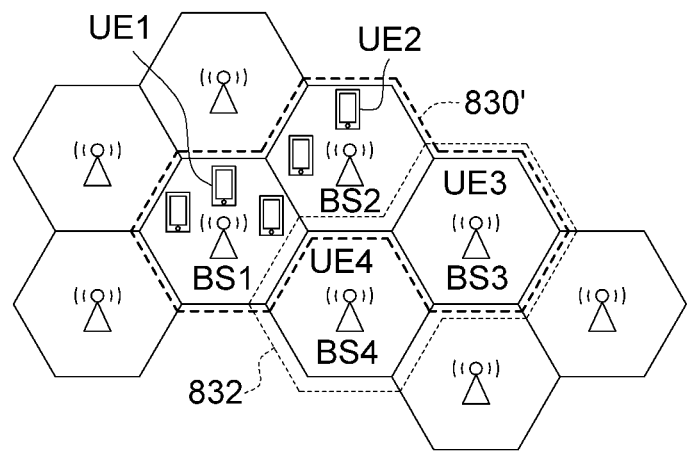

Refer to FIGS. 8A to 8C and FIGS. 9A to 9B. FIGS. 8A to 8C are sequence diagrams of adding a new base station to a broadcast area according to the present disclosure. FIGS. 9A to 9B are schematic diagrams before and after a new base station is added to a broadcast area of FIGS. 8A to 8C. In the first stage STG1 of FIG. 8A, the first program is already bound with the first broadcast area identification code BCArea #1, and the broadcast service base station list corresponding to the first broadcast area identification code BCArea #1 contains the first base station BS #1 and the second base station BS #2. Therefore, the multimedia broadcast/multicast serving gateway 320 transmits the first program to the first user equipment(s) UE1 within the broadcasting range of the first base station BS #1 and the second user equipment(s) UE2 within the broadcasting range of the second base station BS #2 through the first broadcast area. Meanwhile, as indicated in FIG. 9A, the first broadcast area 830 only contains the first base station BS #1 and the second base station BS #2.

In the second stage STG2 as indicated in FIGS. 8A to 8C, within the broadcasting range of the third base station BS #3 of the second broadcast area 832 of FIGS. 9A to 9B, the third user equipment(s) UE3 watching the first program through broadcast increases. Since the third affiliated broadcast area list of the third base station BS #3 only contains the second broadcast area identification code BCArea #2, the multimedia broadcast/multicast serving gateway 320 needs to transmit the first program to the third user equipments UE3 within the broadcasting range of the third base station BS #3 through the second broadcast area 832.

Refer to FIGS. 8B to 8C. In step 802, the consumption reports of the first user equipment(s) UE1 to the third user equipment(s) UE3 are received by the broadcast area management server 316, and the target base stations of the first program are identified as the first base station BS #1 to the third base station BS #3. In step 804, the first broadcast service base station list corresponding to the first broadcast area identification code BCArea #1 is caused to contain the first base station BS #1 to the third base station BS #3 by the setting unit 304, and the lifetime of the first broadcast area identification code BCArea #1 is extended. In step 806, when the broadcast area management server 316 finds that the third affiliated broadcast area list of the third base station BS #3 does not contain the first broadcast area identification code BCArea #1, a command for adding the first broadcast area identification code BCArea #1 is transmitted to the third base station BS #3 by the transmission unit 306. In the step 808 of FIG. 8C, the command for adding the new broadcast area identification code is received by the third base station BS #3 for adding the first broadcast area identification code BCArea #1 to the third affiliated broadcast area list. In step 810, the third base station BS #3 belongs to both the first broadcast area 830' and the second broadcast area 832.

In the third stage STG3 of FIG. 8C, since the third affiliated broadcast area list of the third base station BS #3 already contains the first broadcast area identification code BCArea #1 as indicated in FIG. 9B, the first broadcast area 830' contains the first base station BS #1, the second base station BS #2 and the third base station BS #3. Meanwhile, the multimedia broadcast/multicast serving gateway 320 transmits the first program to the first user equipment(s) UE1 within the broadcasting range of the first base station BS #1, the second user equipment(s) UE2 within the broadcasting range of the second base station BS #2 and the third user equipment(s) UE3 within the broadcasting range of the third base station BS #3 at the same time through the first broadcast area 830', and the second broadcast area 832 stops broadcasting the first program.

Figure 10A:
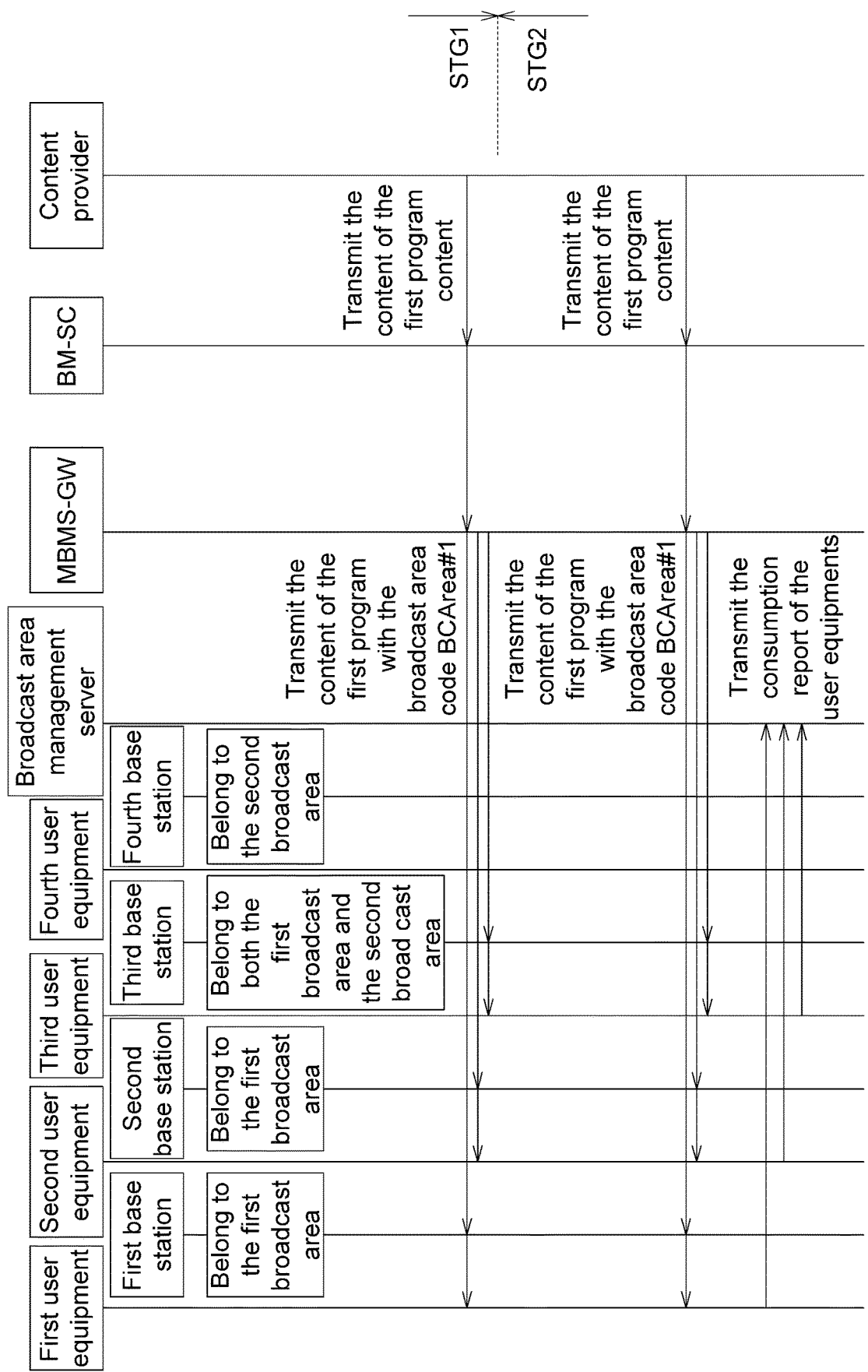
FIGS. 10A to 10C are sequence diagrams of deleting a base station from a broadcast area according to the present disclosure.
Figure 10B:
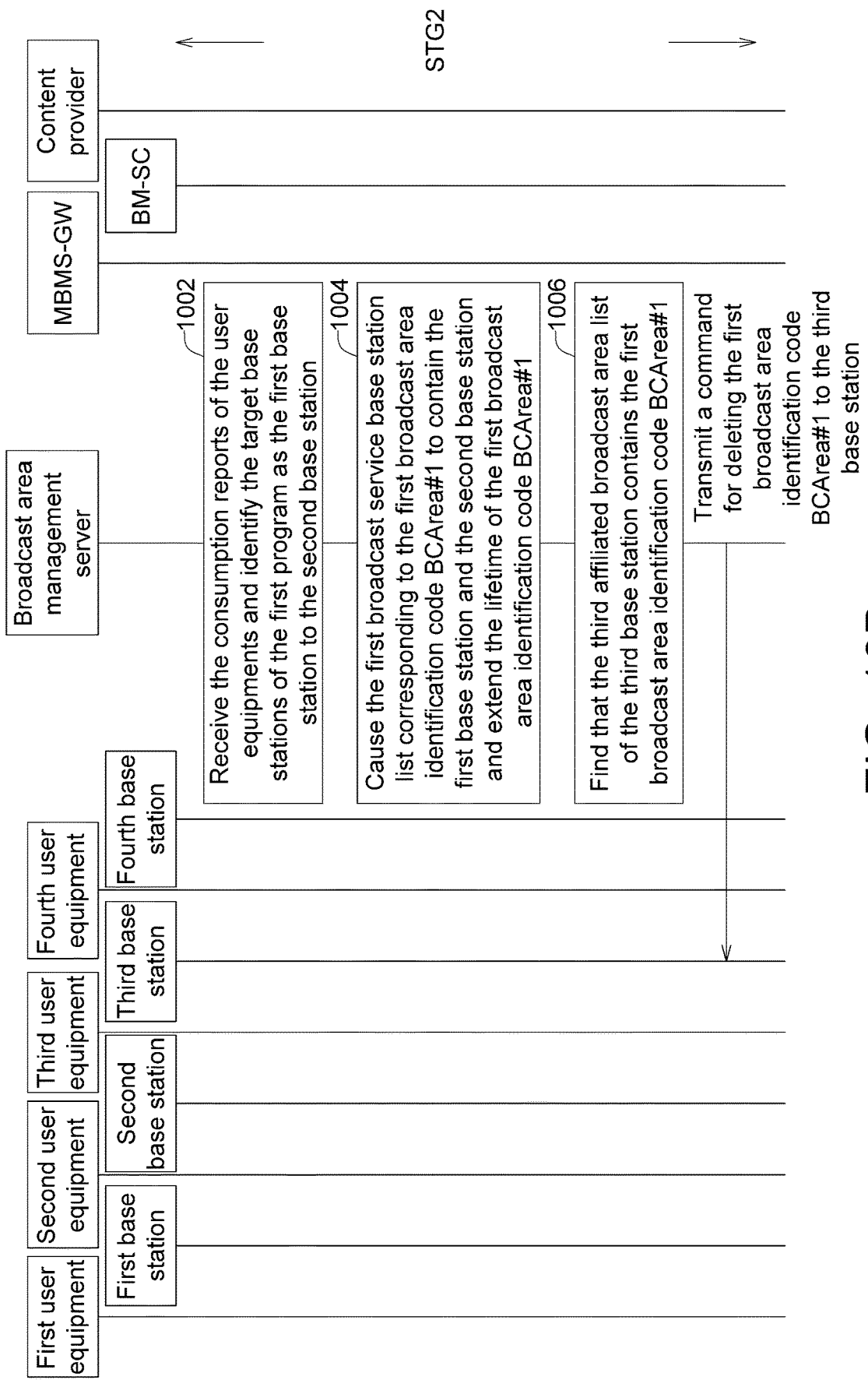
Figure 10C:
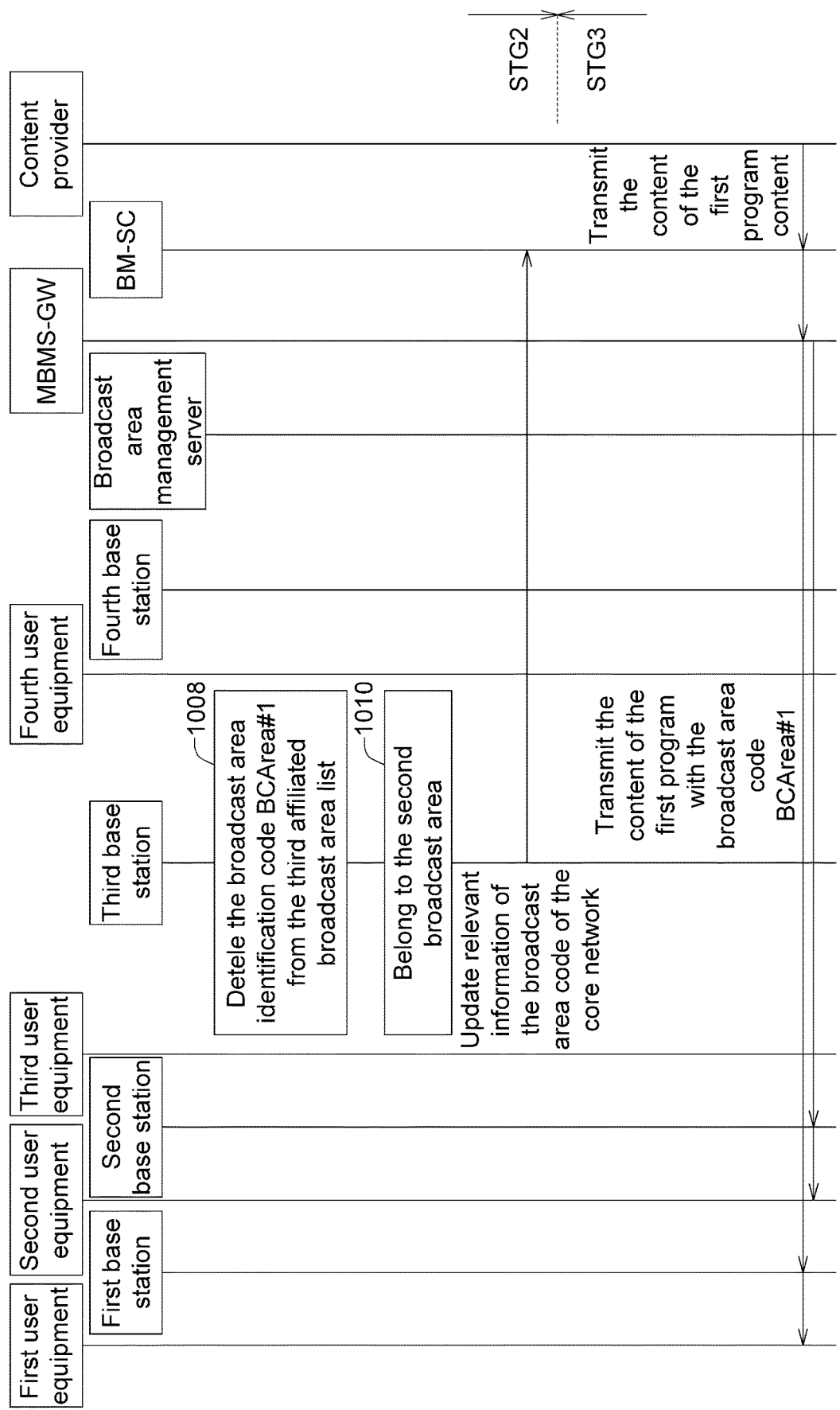

Refer to FIGS. 10A to 10O and FIG. 9B. FIGS. 10A to 10O are sequence diagrams of deleting a base station from a broadcast area according to the present disclosure. In the first stage STG1 of FIG. 10A, the first program is already bound with the first broadcast area identification code BCArea #1, and the broadcast service base station list corresponding to the first broadcast area identification code BCArea #1 contains the first base station BS #1, the second base station BS #2, and the third base station BS #3. Meanwhile, the multimedia broadcast/multicast serving gateway 320 transmits the first program to the first user equipment(s) UE1 within the broadcasting range of the first base station BS #1, the second user equipment(s) UE2 within the broadcasting range of the second base station BS #2, and the third user equipment(s) UE3 within the broadcasting range of the third base station BS #3 at the same time through the first broadcast area 830' as indicated in FIG. 9B.

In the second stage STG2 of FIGS. 10A to 10O, within the broadcasting range of the third base station BS #3, the third user equipment(s) UE3, which originally watch the first program through broadcast, stop watching the first program. In step 1002, the consumption reports of the first user equipment(s) UE1 to the third user equipment(s) UE3 are received by the broadcast area management server 316 and the updated target base station information of the first program that contains the first base station BS #1 and the second base station BS #2 is obtained. In step 1004, the first broadcast service base station list corresponding to the first broadcast area identification code BCArea #1 is caused to contain the first base station BS #1 and the second base station BS #2 by the setting unit 304, and the lifetime of the first broadcast area identification code BCArea #1 is extended. In step 1006, when the broadcast area management server 316 finds that the third affiliated broadcast area list of the third base station BS #3 contains the first broadcast area identification code BCArea #1, the command for deleting the first broadcast area identification code BCArea #1 is transmitted to the third base station BS #3 by the transmission unit 306. In the steps 1008 to 1010 of FIG. 10O, the command for deleting the first broadcast area identification code BCArea #1 is received by the third base station BS #3. Meanwhile, the third base station BS #3 only belongs to the second broadcast area 832.

In the third stage STG3 of FIG. 10O and FIG. 9A, the third affiliated broadcast area list of the third base station BS #3 no longer contains the first broadcast area identification code BCArea #1. Meanwhile, the multimedia broadcast/multicast serving gateway 320 transmits the first program to the first user equipment(s) UE1 within the broadcasting range of the first base station BS #1 and the second user equipment(s) UE2 within the broadcasting range of the second base station BS #2 at the same time through the first broadcast area 830 (as indicated in FIG. 9A), but the third user equipment(s) UE3 within the broadcasting range of the third base station BS #3 no longer receives the first program corresponding to the first broadcast area identification code BCArea #1.

Figure 11A:
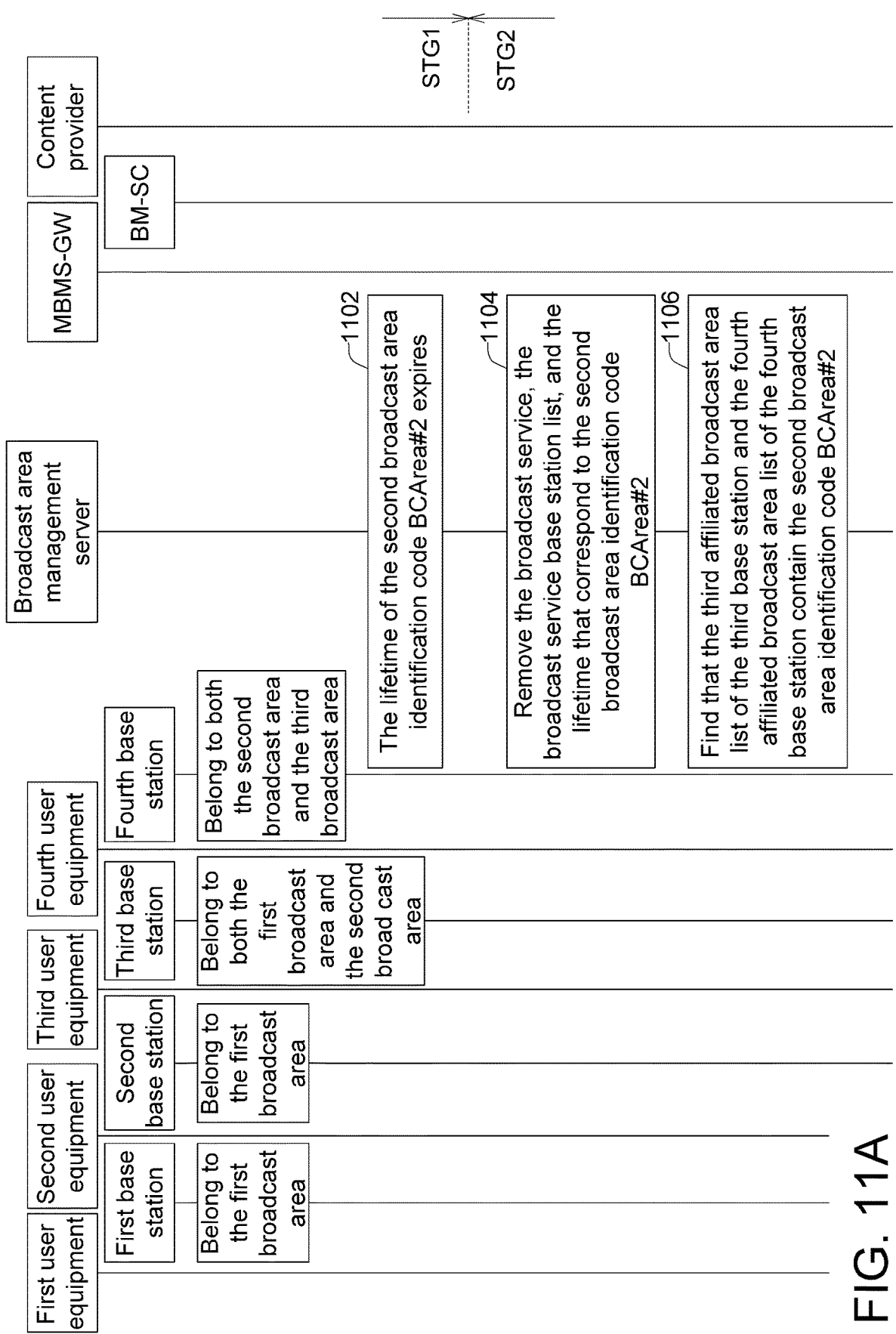
FIGS. 11A to 11B are sequence diagrams of deleting a broadcast area according to the present disclosure.
Figure 11B:
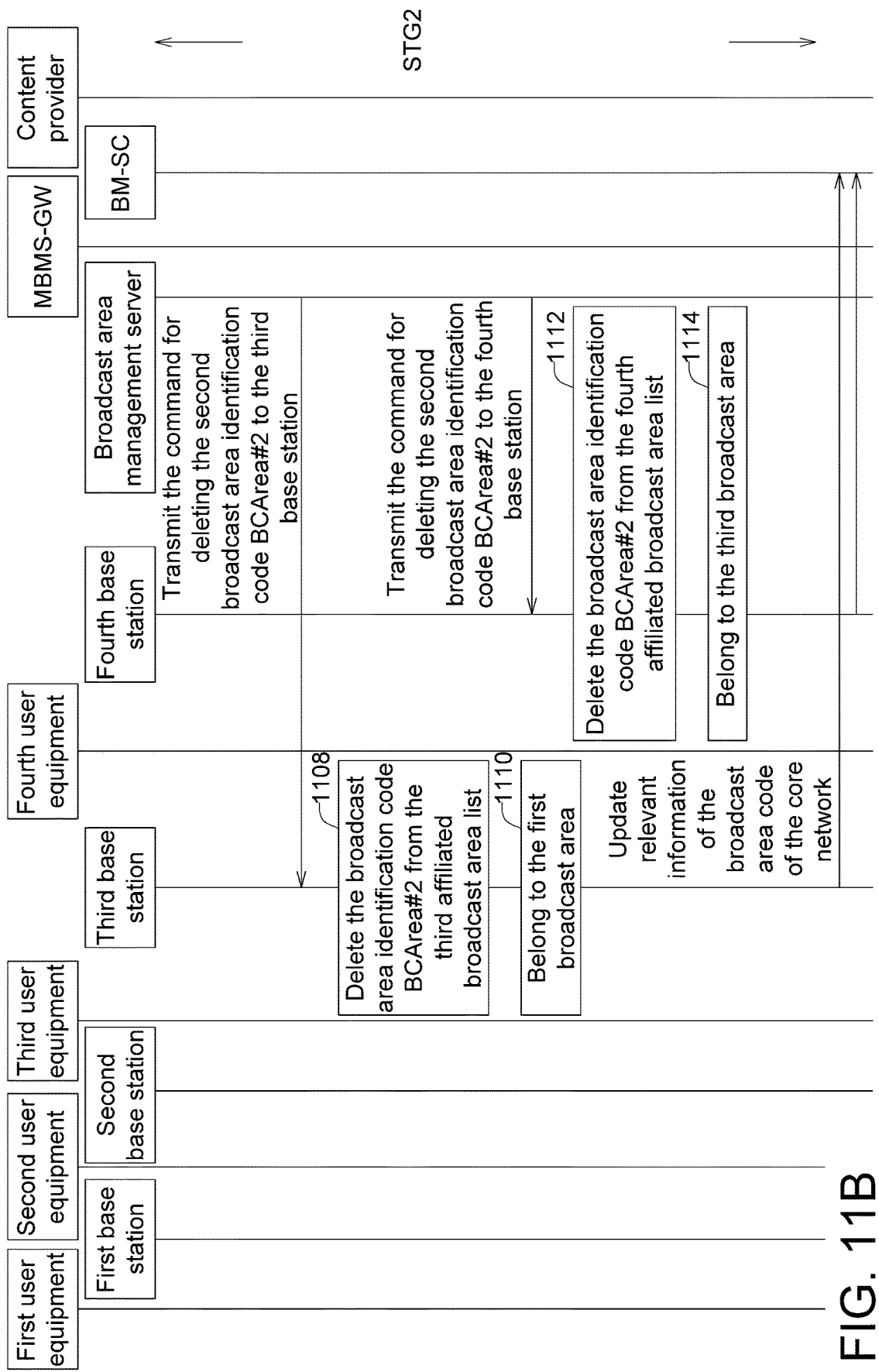

Referring to FIGS. 11A to 11B, sequence diagrams of deleting a broadcast area according to the present disclosure are shown. In the first stage STG1 of FIG. 11A, the broadcast service base station list corresponding to the first broadcast area identification code BCArea #1 contains the first base station BS #1, the second base station BS #2, and the third base station BS #3, the broadcast service base station list corresponding to the second broadcast area identification code BCArea #2 contains the third base station BS #3 and the fourth base station BS #4, and the broadcast service base station list corresponding to the third broadcast area identification code BCArea #3 contains the fourth base station BS #4.

In the step 1102 of FIG. 11A, when the lifetime of the second broadcast area identification code BCArea #2 expires, the method proceeds to the second stage STG2. In step 1104, the broadcast service, the broadcast service base station list, and the lifetime that correspond to the second broadcast area identification code BCArea #2 are removed by the broadcast area management server 316. In step 1106, when the broadcast area management server 316 finds that the third affiliated broadcast area list of the third base station BS #3 and the fourth affiliated broadcast area list of the fourth base station BS #4 contains the second broadcast area identification code BCArea #2, the command for deleting the second broadcast area identification code BCArea #2 is transmitted to the third base station BS #3 and the fourth base station BS #4 by the transmission unit 306. In the steps 1108 to 1110 of FIG. 11B, the command for deleting the second broadcast area identification code BCArea #2 is received by the third base station BS #3 for deleting the broadcast area identification code BCArea #2 from the third affiliated broadcast area list. Meanwhile, the third base station BS #3 only belongs to the first broadcast area 830' (as indicated in FIG. 9B). Similarly, in the steps 1112 to 1114 of FIG. 11B, the command for deleting the second broadcast area identification code BCArea #2 is received by the fourth base station BS #4 for deleting the broadcast area identification code BCArea #2 from the fourth affiliated broadcast area list. Meanwhile, the fourth base station BS #4 only belongs to the third broadcast area.

Unlike the conventional method which needs to provide the broadcast program to all broadcast areas of the base station which subscribes the broadcast service, the method and the device for dynamically adjusting a broadcast area of the embodiments of the present disclosure can flexibly adjust the coverage of the broadcast area according to the base station which subscribes the broadcast service. The method and the device of the embodiments of the present disclosure also resolves the problem of the conventional method transmitting broadcast data through unicast, which uses a large amount of frequency spectrum resources to transmit repeated content. Therefore, the method and the device of the embodiments of the present disclosure not only save the network bandwidth and effectively utilize the network resources, but further increase the efficiency of the transmission of network data and avoid the resource of network bandwidth being wasted.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for dynamically adjusting a broadcast area by a device, comprising:
    obtaining information of at least one target base station which subscribes a broadcast service;
    setting a broadcast service base station list corresponding to a broadcast area identification code to contain the at least one target base station, wherein the broadcast area identification code corresponds to the broadcast service; and
    selectively transmitting a command for adding a new broadcast area identification code to the at least one target base station in the broadcast service base station list so that the at least one target base station records the broadcast area identification code to receive the broadcast service corresponding to the broadcast area identification code;
    wherein the at least one target base station contains a first base station having a first affiliated broadcast area list, and before the step of selectively transmitting the command for adding the new broadcast area identification code, the method further comprises:
    checking the first base station to determine whether the first affiliated broadcast area list contains the broadcast area identification code;
    wherein when the first affiliated broadcast area list of the first base station does not contain the broadcast area identification code, the command for adding the new broadcast area identification code is transmitted to the first base station for adding the broadcast area identification code to the first affiliated broadcast area list.

2. The method according to claim 1, wherein the at least one target base station contains a second base station having a second affiliated broadcast area list, and the method further comprises:
    periodically updating the information of the at least one target base station which subscribes the broadcast service, deleting the second base station from the broadcast service base station list when the second base station of the at least one target base station no longer subscribes the broadcast service, and transmitting a command for deleting the corresponding broadcast area identification code from the second affiliated broadcast area list to the second base station to stop the second base station from receiving the broadcast service corresponding to the broadcast area identification code.

3. The method according to claim 1, wherein in the obtaining step, at least one consumption report of at least one user equipment is received, each consumption report records a user equipment code, an affiliated base station code, and a program code of the corresponding user equipment to obtain the information of the at least one target base station which subscribes the broadcast service according to the at least one consumption report of the at least one user equipment.

4. The method according to claim 3, wherein each consumption report further records a consumption type of the corresponding user equipment to record whether the service corresponding to the program code is obtained through broadcast, multicast, or unicast.

5. The method according to claim 1, wherein the step of setting the broadcast area identification code further comprises:
    before the obtaining step, setting an unused broadcast area identification code as the broadcast area identification code and binding the broadcast area identification code with the broadcast service and the information of the at least one target base station when the broadcast service is not bound with any broadcast area identification codes.

6. The method according to claim 5, wherein when the broadcast area identification code is bound with the broadcast service and the at least one target base station, a lifetime of the broadcast area identification code is set at the same time.

7. The method according to claim 6, wherein when the lifetime of the broadcast area identification code expires, the broadcast service, the broadcast service base station list, and the lifetime that correspond to the broadcast area identification code are removed.

8. The method according to claim 1, wherein the step of setting the broadcast area identification code further comprises:
before the obtaining step, keeping the broadcast area identification code and the program base station list when the broadcast service is bound with the broadcast area identification code and the program base station list corresponding to the broadcast area identification code is consistent with the information of the at least one target base station; and
before the obtaining step, keeping the broadcast area identification code and setting the program base station list to be consistent with the information of the at least one target base station when the broadcast se e is bound with the broadcast area identification code and the program base station list corresponding to the broadcast area identification code is inconsistent with the information of the at least one target base station.

9. The method according to claim 8, wherein when the broadcast area identification code is kept, a lifetime of the broadcast area identification code is extended at the same time, and when the lifetime of the broadcast area identification code expires, the broadcast service, the broadcast service base station list, and the lifetime that correspond to the broadcast area identification code are removed.

10. A device for dynamically adjusting a broadcast area, comprising:
a data collecting unit configured to obtain information of at least one target base station which subscribes a broadcast service;
a setting unit configured to set a broadcast service base station list corresponding to a broadcast area identification code to contain the at least one target base station, wherein the broadcast area identification code corresponds to the broadcast service; and
a transmission unit configured to selectively transmit a command for adding a new broadcast area identification code to the at least one target base station in the broadcast service base station list so that the at least one target base station records the broadcast area identification code to receive the broadcast service corresponding to the broadcast area identification code;
wherein the at least one target base station contains a first base station having a first affiliated broadcast area list, the transmission unit is further configured to check the first base station to determine whether the first affiliated broadcast area list contains the broadcast area identification code before selectively transmitting the command for adding the new broadcast area identification code, when the first affiliated broadcast area list of the first base station does not contain the broadcast area identification code, the command for adding the new broadcast area identification code is transmitted to the first base station.

11. The device according to claim 10, wherein the at least one target base station contains a second base station having a second affiliated broadcast area list, the data collecting unit is further configured to periodically update the information of the at least one target base station which subscribes the broadcast service, when the second base station of the at least one target base station no longer subscribes the broadcast service, the setting unit is further configured to delete the second base station from the broadcast service base station list, and the transmission unit is further configured to transmit a command for deleting the corresponding broadcast area identification code from the second affiliated broadcast area list to the second base station to stop the second base station from receiving the broadcast service corresponding to the broadcast area identification code.

12. The device according to claim 10, wherein the data collecting unit is further configured to receive at least one consumption report of at least one user equipment, each consumption report records a user equipment code, an affiliated base station code, and a program code of the corresponding user equipment to obtain the information of the at least one target base station which subscribes the broadcast service according to the at least one consumption report of the at least one user equipment.

13. The device according to claim 12, wherein each consumption report further records a consumption type of the corresponding user equipment to determine whether the service corresponding to the program code is obtained through broadcast, multicast, or unicast.

14. The device according to claim 10, wherein before the data collecting unit obtains the information of the at least one target base station, the setting unit is further configured to set an unused broadcast area identification code as the broadcast area identification code and bind the broadcast area identification code with the broadcast service and the information of the at least one target base station when the broadcast service is not bound with any broadcast area identification codes.

15. The device according to claim 14, wherein the setting unit is further configured to set a lifetime of the broadcast area identification code at the same time when the broadcast area identification code is bound with the broadcast service and the at least one target base station.

16. The device according to claim 15, wherein the setting unit is configured to remove the broadcast service, the broadcast service base station list, and the lifetime that correspond to the broadcast area identification code when the lifetime of the broadcast area identification code expires.

17. The device according to claim 10, wherein before the data collecting unit obtains the information of the at least one target base station, the setting unit is further configured to keep the broadcast area identification code and the program base station list when the broadcast service is bound with the broadcast area identification code and the program base station list corresponding to the broadcast area identification code is consistent with the information of the at least one target base station; and
wherein before the data collecting unit obtains the information of the at least one target base station, the setting unit is further configured to keep the broadcast area identification code and set the program base station list to be consistent with the information of the at least one target base station when the broadcast service is bound with the broadcast area identification code and the program base station list corresponding to the broadcast area identification code is inconsistent with the information of the at least one target base station.

18. The device according to claim 17, wherein the setting unit is further configured to extend a lifetime of the broadcast area identification code at the same time when the broadcast area identification code is kept and to remove the broadcast service, the broadcast service base station list, and the lifetime that correspond to the broadcast area identification code when the lifetime of the broadcast area identification code expires.

* * * * *